United States Patent [19]

Garrido et al.

[11] Patent Number: 4,854,972
[45] Date of Patent: Aug. 8, 1989

[54] NITROGEN-FREE PROCESS FOR CHLORIDE-ROUTE TiO$_2$ PIGMENT MANUFACTURE

[75] Inventors: Guillermo F. Garrido, St-Bruno; Robert G. H. Lee, Montreal, both of Canada; Olivier Francois, Paris, France

[73] Assignee: Canadian Liquid Air Ltd., Montreal, Canada

[21] Appl. No.: 65,771

[22] Filed: Jun. 23, 1987

[30] Foreign Application Priority Data

Mar. 25, 1987 [CA] Canada ................................... 532986

[51] Int. Cl.$^4$ .......................... C09C 1/36; C01G 23/02
[52] U.S. Cl. ...................................... 106/437; 423/74; 423/79
[58] Field of Search ....................... 106/300, 309, 437; 423/74, 79

[56] References Cited

U.S. PATENT DOCUMENTS

| | | | |
|---|---|---|---|
| 3,445,183 | 5/1969 | Cairns | 423/79 |
| 3,591,333 | 7/1971 | Carlson et al. | 423/74 |
| 3,989,510 | 11/1976 | Othmer | 423/84 |
| 4,332,615 | 6/1982 | Dunn, Jr. | 423/74 |
| 4,389,391 | 6/1983 | Dunn, Jr. | 423/74 |
| 4,460,550 | 7/1984 | Rado | 423/79 |

Primary Examiner—Prince E. Willis
Assistant Examiner—Christine A. Skane
Attorney, Agent, or Firm—Lee C. Robinson, Jr.

[57] ABSTRACT

The invention is concerned with a substantially nitrogen-free process for chloride-route TiO$_2$ pigment manufacture in which a TiO$_2$-containing feedstock is subjected to a fluidized-bed, high temperature carbochlorination in a chlorinator to produce TiCl$_4$ which is thereafter converted to TiO$_2$ by oxidation. The TiO$_2$-containing feedstock and a solid carbonaceous reducing agent are fed to the chlorinator under a CO$_2$ blanketing atmosphere such that the carbochlorination is carried out in a substantially nitrogen-free atmosphere containing CO$_2$ and a CO$_2$-rich flue gas is generated, the CO$_2$ in the chlorinator assisting in controlling thermal balance of the carbochlorination reaction. The absence of significant concentrations of nitrogen in the flue gas results in a favorable condition enabling either or both the CO and CO$_2$ contained in the flue gas to be readily recovered, purified and sold as by-products.

15 Claims, 1 Drawing Sheet

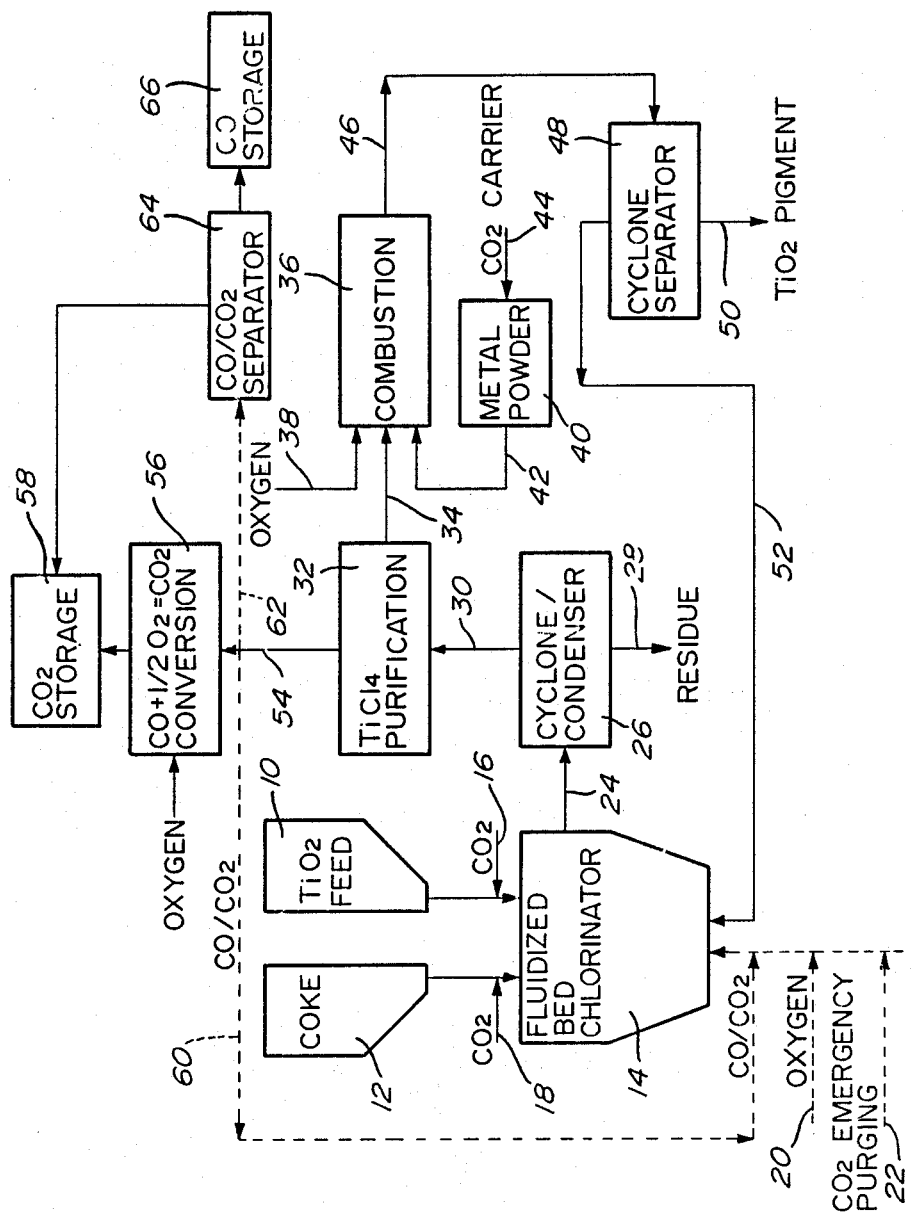

NITROGEN-FREE PROCESS FOR CHLORIDE-ROUTE TiO₂ PIGMENT MANUFACTURE

BACKGROUND OF THE INVENTION

The present invention relates to improvements in the production of $TiO_2$ pigment. More particularly, the invention is concerned with an improved process for chloride-route $TiO_2$ pigment manufacture, which is essentially nitrogen-free.

In the conventional production of $TiO_2$ pigment via the chloride route, a $TiO_2$-containing feedstock such as, for example, rutile, ilmenite or titanoferrous slag, or a mixture thereof, is subjected to a fluidized-bed carbochlorination carried out in a chlorinator at a temperature of about 900°–1100° C. and in the presence of a solid carbonaceous reducing agent such as, for example, finely divided particles of coal, coke or anthracite, to produce $TiCl_4$ which is thereafter converted to $TiO_2$ by oxidation. Nitrogen is introduced at various points of the process in the form of air or as pure nitrogen. For instance, the finely divided coke is generally charged by gravity into the chlorinator under a nitrogen atmosphere to prevent its combustion with the otherwise surrounding air; the $TiO_2$-bearing material is similarly fed under a nitrogen atmosphere, mainly to prevent the chlorine from escaping the chlorinator. Air may also be introduced with the chlorine into the chlorinator to supply auxiliary heat. As a result, a waste gas is generated which contains, along with CO, $CO_2$ and other gases, a considerable amount of nitrogen which deters commercial recovery and purification of $CO_2$.

In the carbochlorination step, to ensure fluidization of the ore bed, a minimum carrier gas velocity of about 0.8 ft/sec needs to be maintained. The fluidizing gas is mainly chlorine which reacts with the metallic components of the ore to form their respective chlorides. The carbochlorination reactions which take place are of the type:

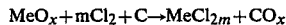

where Me is a metal contained in the $TiO_2$-feedstock, x is a number varying between 1 and 2, and m is a number varying between 1 and 5; examples of Me are Ti, Fe, Al, Mn, Si, Cr, V and Zr. Even though these reactions are slightly exothermic, heat losses to atmosphere and to the preheating of incoming raw materials require a fine control of the chlorinator temperature in order to balance the thermal and fluid dynamic equilibrium. Changes in the ore composition or coke quality may cause temperature changes which can de-stabilize the fluidized bed operation. Air, oxygen or nitrogen, or a mixture thereof, is sometimes used to assist the control of the thermal balance.

SUMMARY OF THE INVENTION

It is therefore an object of the present invention to overcome the above drawbacks and to provide a process for chloride-route $TiO_2$ pigment manufacture, which can be carried out in the absence of nitrogen and allows commercial recovery of $CO_2$ as well as control of the thermal balance and gas dynamics.

In accordance with the invention, there is thus provided a substantially nitrogen-free process for chloride-route $TiO_2$ pigment manufacture in which a $TiO_2$-containing feedstock is subjected to a fluidized-bed, high temperature carbochlorination in a chlorinator to produce $TiCl_4$ which is thereafter converted to $TiO_2$ by oxidation. According to the invention, the $TiO_2$-containing feedstock and a solid carbonaceous reducing agent are fed to the chlorinator under a $CO_2$ blanketing atmosphere such that the carbochlorination is carried out in a substantially nitrogen-free atmosphere containing $CO_2$, thereby generating a $CO_2$-rich flue gas. The $CO_2$ in the chlorinator also assists in controlling the thermal balance of the carbochlorination reaction.

In conventional operations, the nitrogen concentration in the dry flue gas ranges from about 5 to about 20% by volume. By the expression "substantially nitrogen-free atmosphere" as employed herein is meant an atmosphere containing less than about 4% vol. nitrogen, preferably less than about 2.5% vol. This limit nitrogen concentration applies only to normal or steady state operation. Nitrogen concentrations higher than about 4% vol. will inevitably occur during start-up procedures when air-fuel burners are used to preheat the chlorinator.

A distinctive feature of the invention resides in the ability of the $CO_2$ in the chlorinator to cause a faster cooling than that caused by a similar volume of nitrogen: not only does $CO_2$ absorb sensible heat while reaching chlorinator temperature of about 1000° C., as $N_2$ does, but it also removes heat by chemically reacting with coke, according to the endothermic reaction

As temperature decreases, the aforementioned equilibrium is reversed to favor $CO_2$ stability, thus avoiding excessive cooling of the fluidized bed. The use of $CO_2$ results in an extra degree of freedom to operators, allowing control of the thermal balance and gas dynamics without interfering with the chemistry of the volatilized chloride products.

Moreover, by using $CO_2$ instead of nitrogen in the chlorinator as well as in other points of the process where nitrogen is normally used for inerting purposes, an effluent gas richer in $CO_2$ is generated, allowing its commercial recovery. Since $CO_2$ is produced on site, it is readily available as emergency purging gas in the case of equipment breakdown or failure, to maintain the fluidization of solids in the chlorinator in the absence of chlorine. $CO_2$ can also be used for start-up and for idling in case of upset conditions in sections of the process other than the chlorinator.

According to a preferred embodiment of the invention, the $TiCl_4$ which is formed in the chlorinator is withdrawn, purified and subjected to a vapor-phase oxidation carried out in a combustion chamber in the presence of at least one metal powder whose oxidation reaction is strongly exothermic (i.e., releases more than about 150 kilocalories per mole of oxygen reacted) and which upon oxidation produces a white oxide, thereby increasing the exothermicity of the reaction. Examples of such metal powders are Al, Si, Ti, Ca and Mg powders. The metal powder is pneumatically conveyed to and injected into the combustion chamber by means of a carrier gas consisting of $CO_2$ or of a $CO/CO_2$ mixture. Use is also made of substantially pure oxygen or $O_2$/$CO_2$ mixtures instead of air, as oxidizing gas, in order to reduce the concentration of nitrogen in the process.

The $CO_2$-rich flue gas which also contains CO is preferably purified to provide a $CO/CO_2$ mixture from which the CO is converted to $CO_2$, thereby allowing recovery of substantial amounts of $CO_2$. A fraction of the $CO/CO_2$ mixture prior to converting CO to $CO_2$ can be recycled to the chlorinator for combustion of the CO.

BRIEF DESCRIPTION OF THE DRAWING

Further features and advantages of the invention will become more readily apparent from the following description of a preferred embodiment as illustrated by way of example in the accompanying drawing, in which the sole FIGURE is a flow diagram illustrating a nitrogen-free process for chloride-route $TiO_2$ pigment manufacture according to the invention.

DESCRIPTION OF PREFERRED EMBODIMENTS

Referring to the drawing, a $TiO_2$-containing feedstock and finely divided coke contained respectively in feed hoppers 10 and 12 are charged by gravity into a fluidized-bed chlorinator 14 under a $CO_2$ blanketing atmosphere, the $CO_2$ being introduced through lines 16 and 18. In the chlorinator 14, the $TiO_2$-containing feedstock in the presence of the finely divided coke and added chlorine undergoes carbochlorination. Substantially pure oxygen may be introduced through line 20 to supply auxiliary heat; alternatively, an $O_2/CO_2$ mixture can be used to this end. In the case of equipment breakdown or failure, additional $CO_2$ may be introduced as emergency purging gas through line 22 to maintain the fluidization of solids in the absence of chlorine.

Titanium tetrachloride ($TiCl_4$), ferric chloride and chlorides of other contaminating metals and impurities are simultaneously formed, volatilized and removed as a gaseous mixture along with CO and $CO_2$ from the chlorinator 14 through line 24, which gaseous mixture is then delivered to a cyclone/condenser unit 26 to remove precipitating and condensing compounds which are discharged through line 28. The gaseous phase which is withdrawn via line 30 and contains $TiCl_4$, CO, $CO_2$, HCl, $Cl_2$, COS and entrained fine solids is sent to a $TiCl_4$ purification unit 32 in order to separate the $TiCl_4$ vapor from the other gaseous components and thus obtain pure $TiCl_4$ vapor which is removed through line 34 and delivered to a combustion chamber 36 where the $TiCl_4$ is oxidized in vapor-phase to $TiO_2$, in the presence of substantially pure oxygen admitted via line 38. Metal powders such as Mg, Al, Si and Ti powders contained in the storage unit 40 are pneumatically conveyed via line 42 to the combustion chamber 36 and injected therein by means of a carrier gas consisting of $CO_2$ which is admitted into the metal powder storage unit 40 through line 44. $TiO_2$ fine particles withdrawn from the combustion chamber 36 via line 46 are sent to a cyclone separator 48 to separate the solid $TiO_2$ pigment particles from the $Cl_2$-rich gas exiting the combustion chamber 36, the separated $TiO_2$ particles of pigment grade being recovered through line 50 while the gaseous phase containing $Cl_2$ and $CO_2$ is recycled via line 52 to the chlorinator 14.

A $CO_2$-rich flue gas also containing CO is withdrawn from the $TiCl_4$ purification unit 32 via line 54 and sent to a conversion unit 56 for oxidation of the CO to $CO_2$, thereby allowing recovery of the $CO_2$ in substantial amount, which is stored in the $CO_2$ storage tank 58 and may be sold as a by-product. Optionally, a fraction of the $CO/CO_2$ mixture prior to converting CO to $CO_2$ is recycled via line 60 to the chlorinator 14 for combustion of the CO. Where it is desired to recover CO as well as $CO_2$ from the $CO_2$-rich flue gas discharged from the $TiCl_4$ purification unit 32, the $CO/CO_2$ mixture can be sent via line 62 to a $CO/CO_2$ separator 64 for separation of the mixture into CO and $CO_2$ which can thereafter be stored respectively in the storage tanks 58 and 66 and sold as by-products.

The following non-limiting examples further illustrates the invention.

EXAMPLE 1

A waste effluent gas derived from a conventional chloride-route $TiO_2$ pigment plant had a composition of 40% $CO_2$, 45% CO, 10% $N_2$ and 5% by volume of a mixture of chlorides, sulfides and water vapor. Recovery of $CO_2$ necessitated the separation of $N_2$ by either low-temperature condensation of $CO_2$ or chemical methods. Chlorides and sulfides were readily removed either physically (cyclones) or chemically (stripping) at temperatures above ambient.

By replacing the nitrogen normally used in such a process with carbon dioxide, the same operation was carried out resulting in a waste gas containing 50% $CO_2$, 45% CO and 5% by volume of a mixture of chlorides, sulfides and water vapor.

EXAMPLE 2

A chlorinator holding 250 lbs. of a fluidized mixture of coke, ilmenite, rutile, titanoferrous slag, unreacted chlorine and metal chloride products has suddenly attained a temperature of 1120° C. Cooling is attempted by injecting nitrogen gas at ambient temperature. Target temperature is 1060° C. By assuming a heat capacity of 0.20 BTU/lb.°F. for the fluidized mixture, the $N_2$ gas requirement is calculated to be 15 lbs. which absorb 7000 BTU.

By injecting $CO_2$ instead of $N_2$, the same cooling effect was observed with only 5.9 lbs. of $CO_2$, i.e., approximately 40% of the $N_2$ consumption. This is due to the fact that about half of the $CO_2$ endothermically dissociates according to the reaction:

$$CO_2 + C \rightleftharpoons 2\ CO.$$

Thus, each lb. of $N_2$ absorbs 466 BTU whereas each lb. of $CO_2$ absorbs 374 BTU through sensible heat plus an additional 820 BTU due to the above dissociation reaction.

We claim:

1. A substantially nitrogen-free process for chloride-route $TiO_2$ pigment manufacture in which a $TiO_2$-containing feedstock is subjected to a fluidized-bed, high temperature carbochlorination in a chlorinator to produce $TiCl_4$ which is thereafter converted to $TiO_2$ by oxidation, which comprises feeding the $TiO_2$-containing feedstock and a solid carbonaceous reducing agent to said chlorinator under a $CO_2$ blanketing atmosphere such that said carbochlorination is carried out in a substantially nitrogen-free atmosphere containing $CO_2$ and a $CO_2$-rich flue gas is generated, the $CO_2$ in said chlorinator assisting in controlling thermal balance of the carbochlorination reaction, the $TiCl_4$ formed in said chlorinator being withdrawn, purified and subjected to a vapor-phase oxidation in a combustion chamber, and pneumatically conveying to and injecting into said combustion chamber at leat one metal powder to increase exothermicity of the oxidation reaction in said combustion chamber, said metal powder being conveyed to and injected into said combustion chamber by means of a carrier gas consisting of $CO_2$ or of a $CO/CO_2$ mixture.

2. A process according to claim 1, wherein additional $CO_2$ is introduced into said chlorinator as emergency purging gas to maintain the fluidization of solids in the absence of chlorine.

3. A process according to claim 1, wherein said metal powder is selected from the group consisting of Al, Si, Ti, Ca and Mg powders, and mixtures thereof.

4. A process according to claim 1, wherein the vapor-phase oxidation is carried out using as oxidizing gas substantially pure oxygen or a mixture of $O_2$ and $CO_2$ in which the $O_2$ concentration is at least 10% by volume.

5. A process according to claim 3, wherein the vapor-phase oxidation is carried out using as oxidizing gas substantially pure oxygen or a mixture of $O_2$ and $CO_2$ in which the $O_2$ concentration is at least 10% by volume.

6. A process according to claim 1, wherein substantially pure oxygen is introduced into said chlorinator to supply auxiliary heat.

7. A process according to claim 1, wherein a mixture of $O_2$ and $CO_2$ in which the $O_2$ concentration is at least about 10% by volume is introduced into said chlorinator to supply auxiliary heat.

8. A process according to claim 1, wherein the $CO_2$-rich flue gas contains CO and from which $CO/CO_2$ mixture the CO is converted to $CO_2$, thereby allowing recovery of substantial amounts of $CO_2$.

9. A process according to claim 8, wherein a fraction of the $CO/CO_2$ mixture prior to converting CO to $CO_2$ is recycled to said chlorinator.

10. A process according to claim 1, wherein the $CO_2$-rich flue gas contains CO and from which $CO/CO_2$ mixture the CO and $CO_2$ are separated and recovered.

11. A process according to claim 1, wherein said $TiO_2$-containing feedstock comprises rutile, ilmenite or titanoferrous slag, or a mixture thereof.

12. A process according to claim 1, wherein said solid carbonaceous reducing agent comprises finely divided coke.

13. A process according to claim 11, wherein said solid carbonaceous reducing agent comprises finely divided coke.

14. A process according to claim 13, wherein said solid carbonaceous reducing agent and said TiO-containing feedstock are charged into said chlorinator under a gaseous blanketing atmosphere containing $CO_2$, CO and $N_2$ with the $N_2$ content of said gaseous blanketing atmosphere being less than 4% by volume.

15. A process according to claim 14, wherein said gaseous blanketing atmosphere contains less than 2.5% vol. $N_2$.

* * * * *